United States Patent [19]

Ackermann et al.

[11] Patent Number: 4,805,072
[45] Date of Patent: Feb. 14, 1989

[54] DEVICE FOR COUPLING HF ENERGY TO LASERS

[75] Inventors: Frank Ackermann, Stuttgart; Reinhard Wollermann-Windgasse, Vaihingen-Ent/Riet; Bernd Faller, Ditzingen, all of Fed. Rep. of Germany

[73] Assignee: Trumpf GmbH & Co., Ditzingen, Fed. Rep. of Germany

[21] Appl. No.: 115,514

[22] Filed: Nov. 2, 1987

[51] Int. Cl.⁴ .................... H01G 4/38; F27D 3/004
[52] U.S. Cl. ............................. 361/328; 372/82
[58] Field of Search ............... 372/82, 87, 86, 81, 372/88; 361/301, 328

[56] References Cited

U.S. PATENT DOCUMENTS

| | | | |
|---|---|---|---|
| 3,679,997 | 7/1972 | Friedl et al. | 372/82 X |
| 4,620,306 | 10/1986 | Sutter | 372/82 X |
| 4,689,798 | 8/1987 | Fox et al. | 372/82 |
| 4,706,257 | 11/1987 | Brunet et al. | 372/88 |

Primary Examiner—Donald A. Griffin

[57] ABSTRACT

A device for capacitive coupling of HF energy to a laser section has a capacitor situated in the input line, first and second capacitor electrodes, a dielectric situated between them and first and second cooled contact electrodes embracing a dielectric laser tube. The first cooled contact electrode has a surface with a partial region that comprises the first capacitor electrode. A dielectric foil is situated on the partial region and forms the dielectric of the capacitor. And an electric conducting web is situated on the foil and forms the second capacitor electrode.

16 Claims, 3 Drawing Sheets

DEVICE FOR COUPLING HF ENERGY TO LASERS

The invention relates to a device for capacitive coupling of HF energy to a laser section.

BACKGROUND OF THE INVENTION

Energy is fed to power lasers ($CO_2$) lasers) via a capacitor. The capacitors can be employed for the correct apportionment of the power. This means that they must be in a position to transmit energy in the kilowatt range. This, in turn, means that they must be heat-resistant, quite apart from the fact that the laser does indeed become warm during operation and they therefore also receive radiant heat or heat via the input lines. The capacitors are also employed for galvanic separation. Finally, they can be utilized for the purpose of influencing the oscillatory circuit. The frequencies of the HF energy are in the range of the first megahertz decade up to a few tens of megahertz, i.e. (for example, between 5 MHz and 30 MHz. The preferred illustrative embodiment, which will be described later, operates at 13.5 MHz.

Even in the case of power lasers, endeavors are made to construct these with progressively smaller dimensions. However, in the prior art this is obstructed by the dimensioning of the capacitors to be employed. It is not possible to allow the laser sections to extend close enough to one another. Indeed, for reasons of safety, each laser section must also be HF-screened off; in practice, this happens by means of a cover which in most cases is U-shaped in cross-section. In an outward direction, the size of the cover determines the space occupied for the laser section. On account of the position and the dimensioning of the capacitors, it was necessary to use relatively large covers, since the capacitors must also be within the screening.

Over and above this, of course, the capacitors are components which have to be purchased, have to be kept in store and which are available only in specified magnitude steps (also in terms on the capacitance).

OBJECT AND STATEMENT OF THE INVENTION

The object of the invention is to provide a device which permits a substantially more compact construction, so that the laser tubes (in most cases consisting of qaurtz glass) can pass closer to one another, so that, in the final analysis, the cover for the laser section can also be kept small.

Such coupling devices have an input line, a capacitor situated in the input line, first and second capacitor electrodes and a dielectric situated between them. Such devices also have a dielectric laser tube, first and second cooled contact electrodes embracing the dielectric laser tube, and an output line connected at least electrically to the second cooled contact electrode.

Of course, no concessions are to be made with regard to the heat resistance, the transmissibility of energy and the simple construction.

According to the invention, the object of the invention is achieved by the following features:

(a) The first cooled contact electrode has a surface with a partial region that comprises the first capacitor electrode, (b) a dielectric foil is situated on the partial region and forms the dielectric of the capacitor, and (c) an electric conducting web is situated on the foil and forms the second capacitor electrode.

The surface of the first contact electrode, which surface is present in any event, is now utilized. In terms of volume, the foil itself can be entirely disregarded, and an electrical conducting web has—even if it is every stiff—a negligible thickness. It is, in any event, necessary to supply the HF energy to the contact electrodes via a conducting web, so that the conducting web per se also does not represent any further expenditure. Since the contact electrodes are, in fact, cooled, the capacitor formed in this way remains cool as well, with all advantages resulting from this.

Also, the described embodiment includes the following advantageous features:

The partial region extends along the length of the contact electrode. By this feature, it is possible to attain comparatively large capacitances, since the contact electrodes are, in fact, made only insignificantly shorter than the laser tubes are long. Such a contact electrode has a length of up to a few tens of centimeters, and accordingly the partial region can be made long. Its extent in the width direction—in order to arrive at a surface—is then no problem. Moreover, the electrode is then supplied with energy via this length. It is not, for example, connected only via a small cross-section, so that the contact electrode is HF-connected over its entire length. Cooled contact electrodes—for example, in contrast to electrodes formed from sheet metal strips—are invariably very massive metal rods. Therefore, these are in no way whatsoever affected if they carry, mechanically and also electrically, such a long capacitor.

The partial region is a longitudinal strip with straight longitudinal structures. The foils, which are frequently supplied as longitudinal strips, fit such a longitudinal strip and these must then, as appropriate, only be cut at an edge, if they should be too wide. The foil webs supplied on rolls thus fit such a longitudinal strip.

The contact electrode surface comprises a back surface on the contact electrode, and the partial region is situated on the back surface of the contact electrode. The partial region does not see the associated laser tube; that is to say, it is also not stressed by radiant heat and therefore remains still cooler. Moreover, the flanks of the contact electrode remain free for the cooling bores and cooling connections. The back of the contact electrode can, without further ado, be kept planar, since it has no additional functions. Furthermore, any disturbance due to other causes is least if the back is used to form the capacitor.

The partial region is planar. The capacitance is at a maximum level, since interruptions, corrugations or the like would reduce the capacitance, since these would increase the spacing between the regions forming capacitor electrodes.

The foil is self-adhesive.

The foil extends beyond the partial region. Flashovers between the electrical conducting web and the contact electrode are avoided.

The contact electrode surface comprises a back surface on the contact electrode, and substantially the entire back surface of the contact electrode is covered with the foil. It is only necessary to cover the entire back with foil; this is cheaper than if it is necessary to cover only a specified field on the back with foil. Such a procedure is especially suitable if the foil is self-adhesive on one side. If the foil per se is too wide for the back, when this is of no importance, because it is then only necessary to cut it according to the edges of the back, after it has been affixed.

The foil consists of a material of the tetrafluoroethylene type. A dielectric which is very resistant to aging is achieved, with respect to the operating conditions in a laser. Moreover, foils of this type are available in all possible, finely-graded thicknesses, so that the capacitance value can also be finely graded.

The conducting web is a metal profile that is resistant to bending. There is no need to vapor-deposit, or the like, the conducting webs onto the foil. Rather, it is possible to add the conducting webs to the construction as a separate component. If the metal profile is resistant to bending, then it also rests without corrugations tightly against the foil.

The metal profile is a flat profile that extends on the partial region. The metal profile extends downwards, which would not be the case to this extent if it were, for example, a U-profile.

The conducting web is in one piece. The metal profile distributes the energy uniformly over its entire length, and no impact positions are created at which the foil could be pressed through or could be pressed in.

The first contact electrode comprises at least two partial electrodes. It is possible to divide up the contact electrodes into electrodes of differing size; in some cases, this contributes constructional advantages.

This makes sense especially when the foil on the partial electrodes comprises a plurality of foil pieces of differing thicknesses, since now it is possible to provide capacitances of differing magnitude along the laser tube. For example, the partial electrodes situated upstream can carry a thinner foil than further downstream, so that more HF energy is coupled in there. However, it is also possible to construct other capacitor arrangements thereby.

A plurality of securing yokes are provided, with pressing screws in the securing yokes that press onto the metal profile to press the contact electrodes against the dielectric laser tube. It is possible both to secure the metal profile to the back of the first contact electrodes and also to press the two contact electrodes sensitively against the laser tube.

Each of the securing yokes has a transverse yoke, and the pressing screws are positioned centrally at the transverse yokes. This pressing takes place symmetrically and no tilting inclination of the contact electrodes relative to one another is produced.

DESCRIPTION OF THE DRAWINGS

A preferred illustrative embodiment of the invention is described in the text which follows. In the drawing.

DESCRIPTION OF PREFERRED EMBODIMENT

Figure 1:
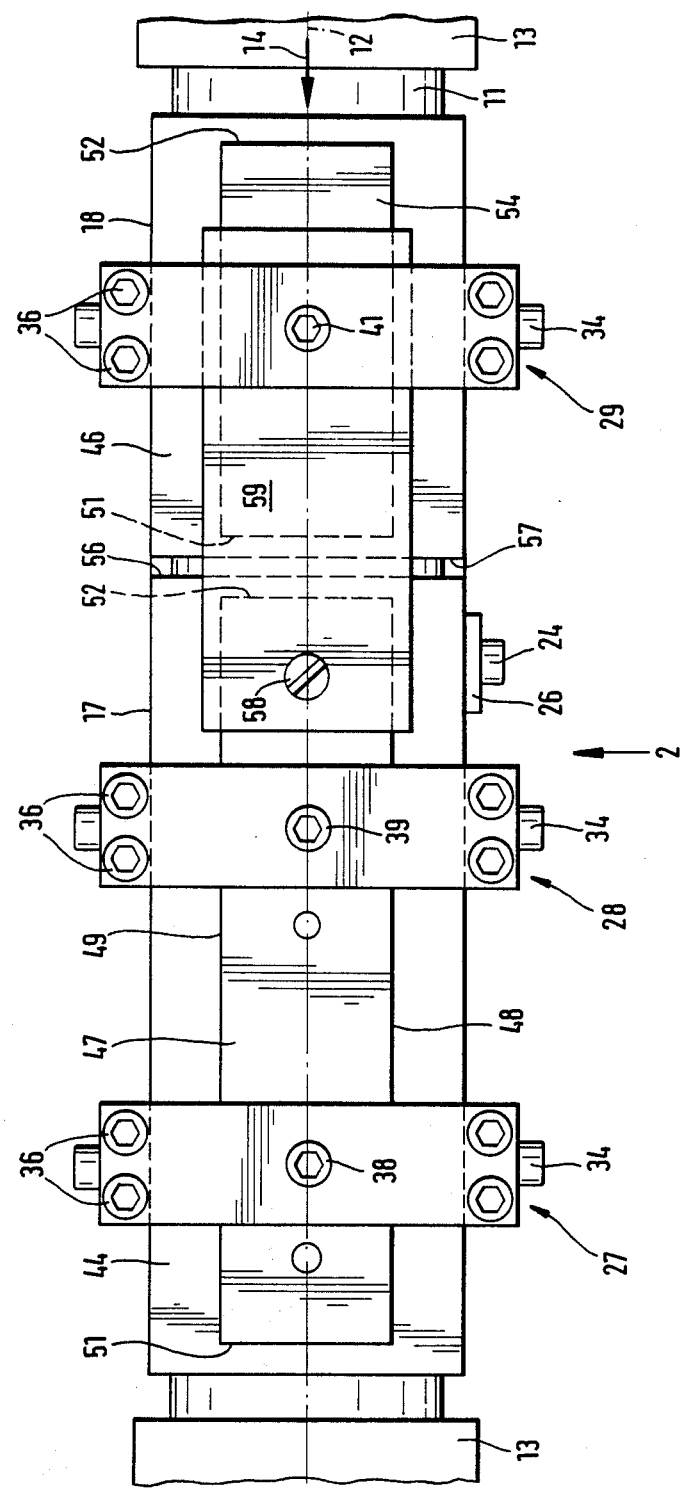
FIG. 1 shows a plan view of the back of the device secured to a laser tube.

A circular-cylindrical laser tube 11, consisting of quartz glass, extends along a geometric longitudinal axis 12 and is mounted at its two ends by means of respective mountings 13. The gas flows according to the arrow 14 in the laser tube 11. According to FIGS. 2 and 3, a first contact electrode 16 consisting of two partial electrodes 17, 18 is provided above the laser tube 11. The partial electrode 17 is more than twice as long as the partial electrode 18. Seen in the longitudinal direction, they have a small spacing which does, however, prevent an electrical flash-over. Below the laser tube 11 a second contact electrode 19 is provided, which is situated exactly opposite the first contact electrode 16. By channels 21, which are coaxial with the longitudinal axis 12, the contact electrodes 16, 19 rest fully on the upper and lower peripheral regions of the laser tube 11. The partial electrodes 17, 18 and the contact electrode 19 are produced in one piece from massive aluminum, in which cooling bores (not shown) with cooling connections (not shown) are provided. The end faces 22, coming closest to one another according to FIG. 3, of the contact electrodes 16, 19 at approximately 3 o'clock and 9 o'clock (FIG. 3) are so far distant from one another that no electrical flash-over takes place there. The flanks 23, which are vertical in FIG. 3, of the contact electrodes 16, 19 are in alignment with one another and have, seen in the lateral direction, a greater spacing from one another than corresponds to the external diameter of the laser tube 11.

Figure 3:
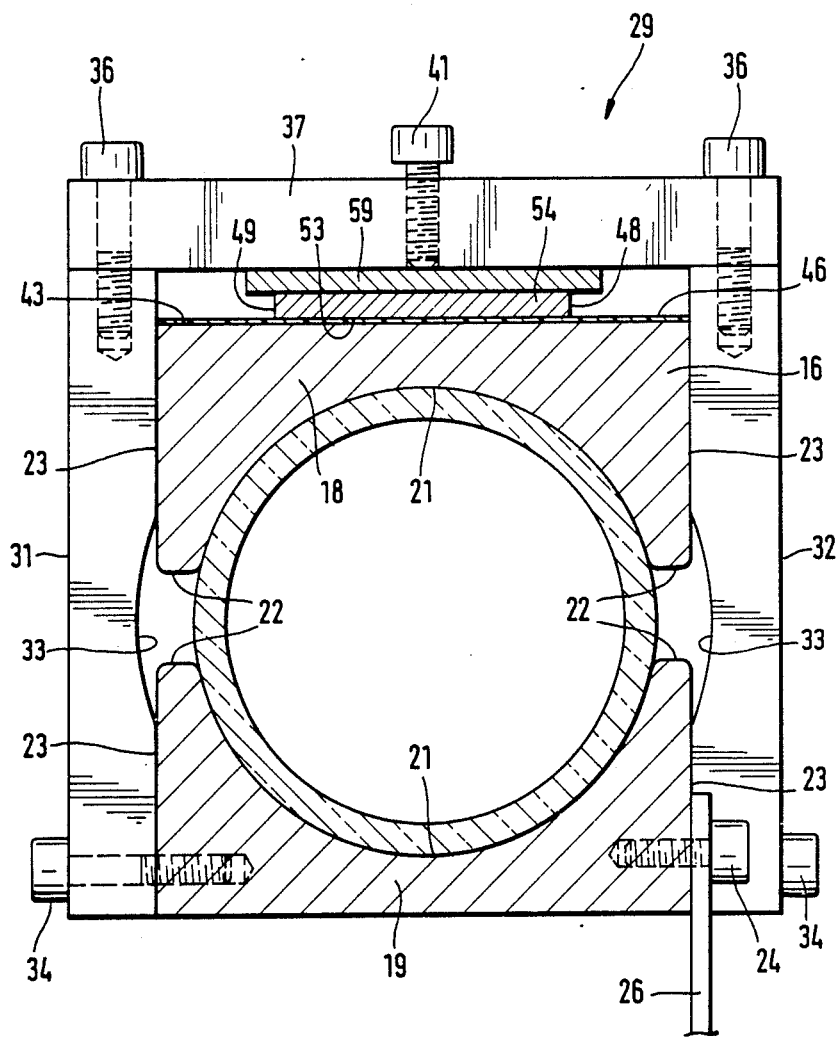
FIG. 3 shows a representation, enlarged once again, of a cross-sectional along the line 3.3 in FIG. 2.

A copper sheet 26 is screwed centrally, by a screw 24, to the flank 23, on the right according to FIG. 3, of the second contact electrode 19. Since this plate is electrically at ground, the second contact electrode 19 is also at ground.

Three yokes 27, 28 and 29 are provided, which consist of an electrically non-conductive, heat-resistant plastic material. In this case, the yokes 27, 28 draw the partial electrode 17 towards the laser tube 11, just like the left-hand region of the contact electrode 19, and the yoke 29 draws the partial electrode 18 and the contact electrode 19 in the right-hand region likewise. Each yoke has two longitudinal limbs 31, 32, the inner surfaces of which, with the exception of a hollow 33 in the region of the end faces 22, are planar and these also rest guidingly on the flanks 23. The lower ends of the longitudinal limbs 31, 32 are fixedly screwed by means of screws 34 to the flanks 23 of the second contact electrode 19 in its lower region. A transverse limb 37 which is resistant to bending is screwed by means of screws 36 to the upper end face of the longitudinal limbs 31, 32. Precisely at the center and vertically above the geometric longitudinal axis 12, each yoke 27, 28, 29 has a pressing screw 38, 39, 41.

The partial electrodes 17, 18 have planar backs 42, 43, which are entirely in alignment with one another. On the back 42, to its full, elongate rectangular surface there is affixed a self-adhesive foil 44, which is, however, so thin that it cannot be shown in FIG. 2. There is also affixed to the back 43 a self-adhesive foil 46, which is visible in FIG. 3 only because it is represented with a considerably exaggerated thickness. The foils 44, 46 are made from tetrafluoroethylene, e.g. foils of Teflon (registered trademark). An I profile 47 (also called a flat profile) made of aluminum, which is several millimeters thick, lies on the foil 44, symmetrically in relation to the longitudinal axis 12 in the elevation of FIG. 1. Its right-hand edge 48 and its left-hand edge 49 extend parallel to the fanks 23 and thus to the corresponding edge of the foil 46, which extends only as far as the flanks 23. The edges 48, 49 have a considerable spacing from the flanks 23. The same applies, mutatis mutandis, for the transverse edges 51, 52 of the I profile 47. The surface size of the lower surface 53 of the I profile 47, the spacing from the back 42 and the dielectric properties of the foil 44 determine the magnitude of the capacitance of the capacitor. Accordingly, only a partial region of the back 43 acts as capacitor electrode.

The pressing screw 38 presses onto the top surface of the I profile 47 in its left-hand region, and the pressing screw 39 presses in the right-hand region of the I profile 47.

Figure 2:
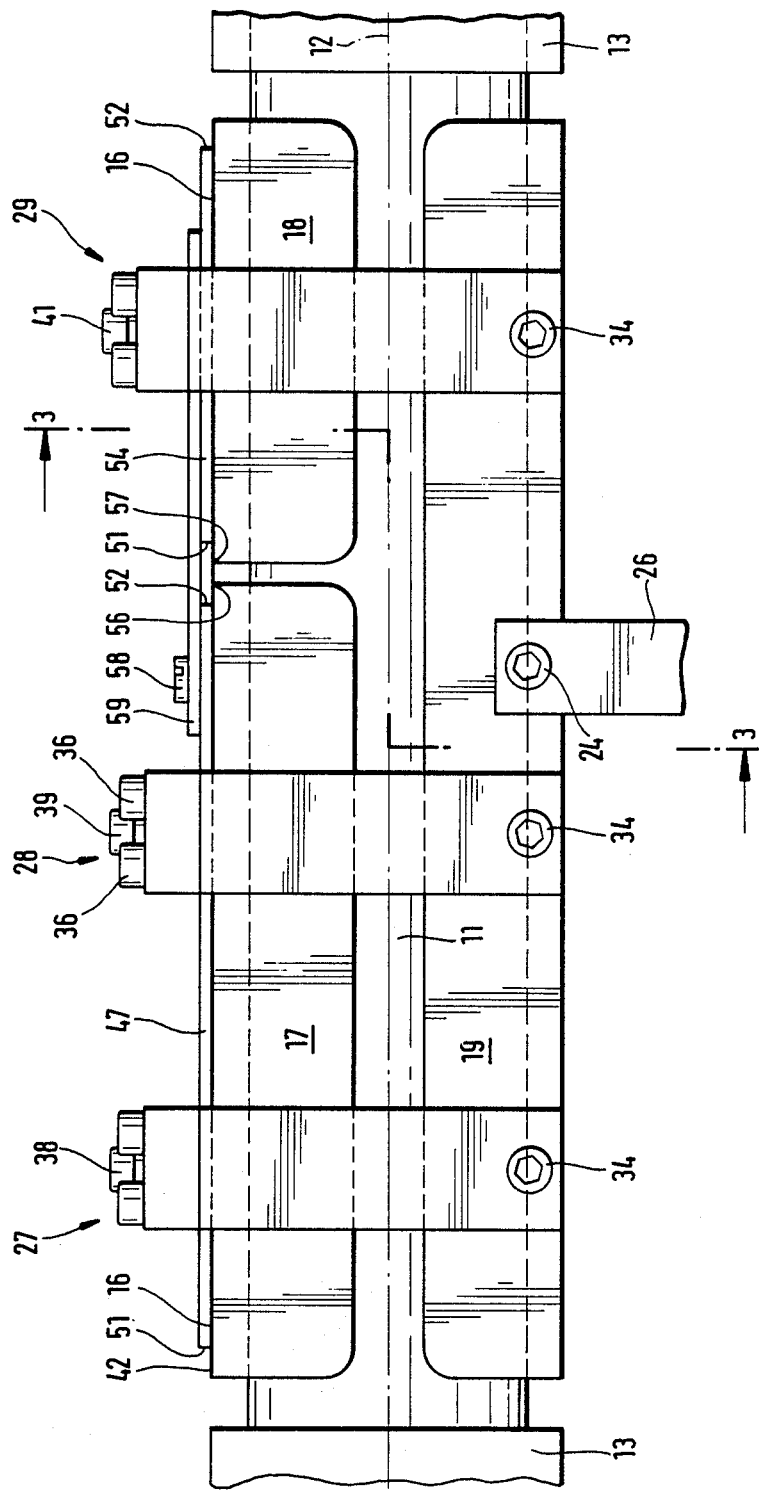
FIG. 2 shows an elevation according to the arrow 2 in FIG. 1.

The foil 46 on the back 43 of the partial electrode 18, on the right according to FIGS. 1 and 2, is fitted in accordance with the same principles. On it lies an I profile 54, which is designed likewise according to the same principles as the I profile 47 and which thus likewise has such edges 48, 49 in alignment, transverse edges 51, 52 and a lower surface 53.

If the foil 44 around the transverse edge 56 were to be struck downwards a bit, and if the foil 46 around the transverse edge 57 were to be struck downwards a bit, then the I profile 47, 54 could be made in one piece, i.e. it could be made continuous.

A copper sheet 59 is secured, by a screw 58, both electrically and also mechanically to the right-hand end region of the I profile 47. The screw 58 does not, of course, pass through the foil 44. The copper sheet 59 also lies, in its right-hand region, on the I profile 54 and is also in HF contact with the latter. The copper sheet 59 supplies the HF. The copper sheet 59 extends under the transverse limb 37 of the yoke 29, and its pressing screw 41 both presses the copper sheet 59 towards the I profile 54 and also presses this towards the foil 46. Since the copper sheet 59 is situated higher than the back 42, 43 by the thickness of the I profiles 47, 54, no flash-over takes place.

What is claimed is:

1. A device for capacitive coupling of HF energy to a laser section, comprising
   an input line,
   a capacitor situated in said input line and having a first capacitor electrode, a second capacitor electrode and a dielectric situated between said first and second capacitor electrodes,
   a dielectric laser tube,
   a first and a second cooled contact electrode embracing said dielectric laser tube,
   an output line connected at least electrically to said second cooled contact electrode,
   and the improvement wherein
   (a) said first cooled contact electrode has a surface with a partial region that comprises said first capacitor electrode,
   (b) a dielectric foil is situated on said partial region and forms said dielectric of said capacitor, and
   (c) an electric conducting web is situated on said foil and forms said second capacitor electrode.

2. The device as claimed in claim 1, wherein said partial region extends along the length of said contact electrode.

3. The device as claimed in claim 1, wherein said partial region is a longitudinal strip with straight longitudinal structures.

4. The device as claimed in claim 1, wherein said contact electrode surface comprises a back surface on said contact electrode, and said partial region is situated on said back surface of said contact electrode.

5. The device as claimed in claim 4, wherein said partial region is planar.

6. The device as claimed in claim 1, wherein said foil is self-adhesive.

7. The device as claimed in claim 1, wherein said foil extends beyond said partial region.

8. The device as claimed in claim 1, wherein said contact electrode surface comprises a back surface on said contact electrode, and substantially said entire back surface of the contact electrode is covered with said foil.

9. The device as claimed in claim 1, wherein said foil consists of a material of the tetrafluoroethylene type.

10. The device as claimed in claim 1, wherein said conducting web is a metal profile that is resistant to bending.

11. The device as claimed in claim 10, wherein said metal profile is a flat profile that extends on said partial region.

12. The device as claimed in claim 10, comprising a plurality of securing yokes and pressing screws in said securing yokes that press onto said metal profile to press said contact electrodes against said dielectric laser tube.

13. The device as claimed in claim 12, wherein each of said securing yokes has a transverse yoke, and said pressing screws are positioned centrally at said transverse yokes.

14. The device as claimed in claim 1, wherein said conducting web is in one piece.

15. The device as claimed in claim 1, wherein said first contact electrode comprises at least two partial electrodes.

16. The device as claimed in claim 15, wherein said foil on said partial electrodes comprises a plurality of foil pieces of differing thicknesses.

* * * * *